United States Patent
Rehbein et al.

(10) Patent No.: US 7,589,290 B2
(45) Date of Patent: Sep. 15, 2009

(54) ELECTRIC CONTACT

(75) Inventors: Peter Rehbein, Weissach (DE); Volker Haas, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 30 days.

(21) Appl. No.: 10/524,726

(22) PCT Filed: Oct. 2, 2003

(86) PCT No.: PCT/DE03/03296

§ 371 (c)(1),
(2), (4) Date: Feb. 16, 2005

(87) PCT Pub. No.: WO2004/032284

PCT Pub. Date: Apr. 15, 2004

(65) Prior Publication Data

US 2006/0163047 A1    Jul. 27, 2006

(30) Foreign Application Priority Data

Oct. 2, 2002    (DE)    ................. 102 46 062

(51) Int. Cl.
    *H01H 1/02* (2006.01)
(52) U.S. Cl. ............ 200/262; 200/266; 200/268; 174/126.1; 428/614; 428/673; 428/332
(58) Field of Classification Search ......... 200/262–263, 200/265–269, 270; 174/126.1, 126.2; 428/614, 428/646, 673, 332, 336
    See application file for complete search history.

(56) References Cited

U.S. PATENT DOCUMENTS

| 3,623,205 | A | * | 11/1971 | Scott | ............. 428/643 |
| 4,100,385 | A | * | 7/1978 | Wutz | ............. 200/268 |
| 4,138,604 | A | * | 2/1979 | Harmsen et al. | ........... 200/267 |
| 4,339,644 | A | * | 7/1982 | Aldinger et al. | ........... 200/266 |
| 5,420,056 | A | * | 5/1995 | Moslehi | ........... 438/308 |
| 5,800,932 | A |   | 9/1998 | Suzuki et al. | |
| 5,892,424 | A |   | 4/1999 | Yamamoto et al. | |
| 6,136,460 | A | * | 10/2000 | Chen et al. | ........... 428/699 |
| 6,183,886 | B1 |   | 2/2001 | Chen et al. | |

FOREIGN PATENT DOCUMENTS

| EP | 0 428 740 | | 5/1991 |
| JP | 63-221517 A | * | 9/1988 |
| JP | 8298038 | | 11/1996 |

* cited by examiner

*Primary Examiner*—Kyung Lee
(74) *Attorney, Agent, or Firm*—Kenyon & Kenyon LLP

(57) ABSTRACT

An electrical contact, especially an electrical contact of a plug connector, includes a metallic substrate on which a contact layer is applied in the form of a gradient layer. The gradient layer is formed by at least two elements of which one is silver and forms a matrix for the second element or forms an alloy therewith, or of which one is tin and the other is phosphorus or of which one is indium and the other is tin.

6 Claims, 1 Drawing Sheet

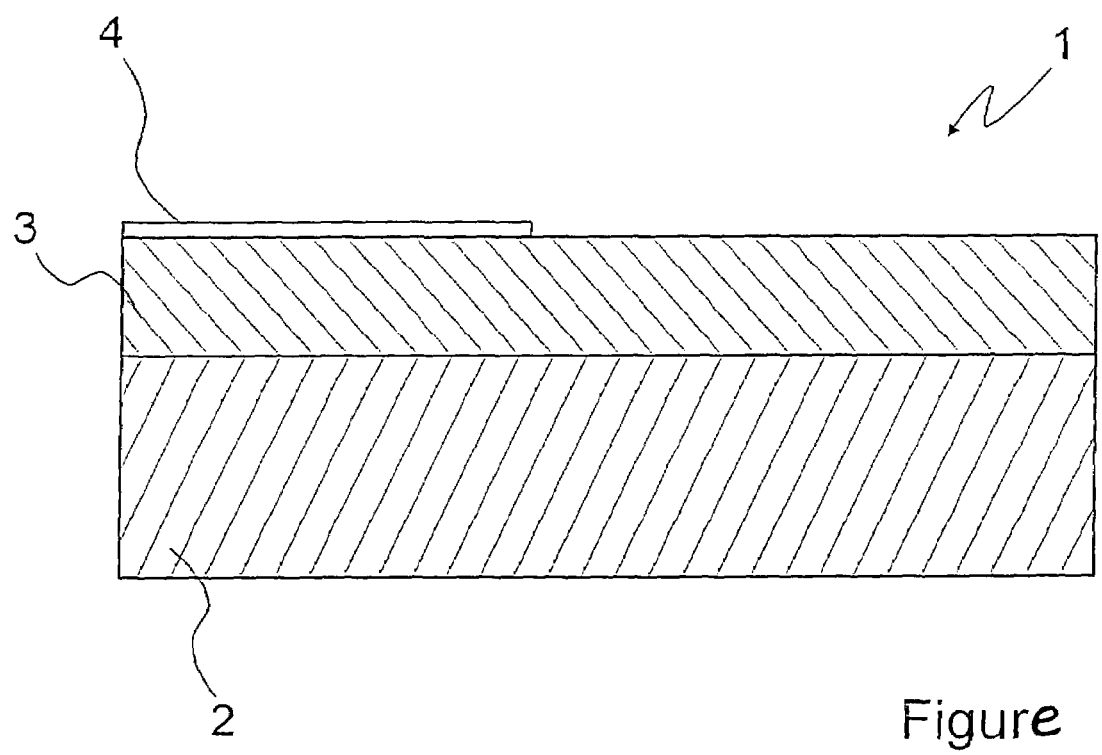
Figure

ELECTRIC CONTACT

FIELD OF THE INVENTION

The present invention is based on an electrical contact, in particular an electrical contact of a plug connector.

BACKGROUND INFORMATION

An electrical contact is described in U.S. Pat. No. 5,892,424 and represents an encapsulated point of contact of an electrical connection. The known electrical contact is made up of a substrate on which a contact layer is deposited to reinforce the wear resistance of the electrical contact. This contact layer has a matrix formed from a first element, which is doped by a second element. The matrix can be made up of an element selected from the group that includes Mo, Zr, Nb, Hf, Ta and W. The additional element may be an element selected from a group that includes Zn, Cd, Hg, Al, Ga, In, Tl, Ge, Sn, Pb, As, Sb and Bi. The additional element stabilizes the contact resistance of the electrical contact during an electrical switching operation. Furthermore, the additional element leads to an improvement in the wear resistance and the oxidation resistance of the electrical contact. The proportion of additional elements in the contact layer may amount to between 0.5 atom % and 50 atom %.

The contact layer in the known electrical contact is applied according to a sputtering method, an ion-supported vapor-deposition method, an ion-plating method or a plasma CVD method. However, due to a required ultra-high vacuum, these methods are involved and not suited for the production of high quantities.

Furthermore, the metals from which the contact layer of the known electrical contact is made, are expensive and therefore also not suitable for contacts that are required in large numbers. This applies especially to electrical contacts in motor vehicles, which are required in quantities of 1000 to 3000 pieces per motor vehicle.

In practice, electrical contacts in the automotive sector often have a contact layer made of tin. This layer may be a hot-dipped or a galvanically deposited layer having a thickness of a few micrometers. Tin is characterized by its ductility as well as its excellent electrical conductivity. When using a tin contact layer, diffusion causes an intermediate layer to be formed at the boundary surface to the substrate, which normally is made of an alloy on copper basis such as CuSn4 bronze, CuNiSi or the like, the intermediate layer consisting of intermetallic compounds such as CuSn3, Cu5Sn6. The intermediate layer is harder than the contact layer and may grow as a function of temperature.

However, tin alloys or tin-alloy layers have the disadvantage that they tend to wear off due to their low hardness and the resulting low wear resistance during frequent plug-ins or due to vehicle- or engine-related vibrations, thereby causing increased oxidation—the so-called chafing corrosion. The erosion and/or chafing corrosion in turn may lead to malfunction of an electrical component of a motor vehicle assigned to the contact in question, for instance a sensor, a control unit or the like.

Another disadvantage of such tin layers is that, because of the high adhesion tendency and the plastic deformation of these contact layers, the plug forces are too high for many application cases.

Also known from practice is a contact layer of an electrical contact made on the basis of tin—also referred to as thermotin—, which is completely made of intermetallic phases and produced by heat treatment. Abrasion tests have shown such contact layers to be of limited use too.

In addition, AuCo alloys with a tin undercoat, silver layers with a copper undercoat or a tin undercoat or also gold layers are currently often used as contact layer in electrical contacts.

Surface or contact layers on the basis of silver, in particular, but tin as well, exhibit a cold welding tendency due to adhesion and, when combined with each other, are characterized by high friction coefficients.

Even with silver or gold layers currently used in electrical contacts, oxidative wear processes of the substrate or an intermediate layer—often made of copper or nickel and used as an adhesion layer—may occur once the layer has eroded or chipping has occurred in the layer.

SUMMARY OF THE INVENTION

The electrical contact according to the present invention, which has a metallic substrate on which a contact layer in the form of a gradient layer is applied that is formed by at least two elements of which one is silver and forms a matrix for the second element or forms an alloy therewith, or of which one is tin and the other is phosphorus or of which one is indium and the other is tin, has the advantage that, as a result of the components used for the contact layer, their availability and their relatively low procurement costs, it constitutes a contact layer which is suitable also for electrical contacts required in high quantities.

A gradient layer within the meaning of the present invention is to be understood as a contact layer in which the proportion of the two elements changes in the direction of the normal of the substrate plane. For instance, the tin proportion in a silver matrix or silver/tin alloy may decrease in the direction facing away from the substrate. The change in the element proportions of the contact layer may be linear, in which case a linear concentration gradient is present. As an alternative, however, it may also be a concentration gradient that varies according to a step function. The proportion of the one element in the contact layer basically may run the range between 0% and 100% in the gradient direction.

The substrate is, for instance, a substrate conventionally used in plug-in connections in the automotive sector, for example an alloy on copper basis such as CuSn4 bronze, CuNiSi or the like. As an alternative, a substrate made from an alloy on tin basis may be used as well.

If one of the two elements in the electrical contact according to the present invention is silver, which forms a matrix for the second element or forms an alloy together with the second element, the second element or the additional element may be tin, gold or indium as well.

The gradient layer preferably has a thickness of approximately 1 μm to 3 μm, but may also be implemented at greater thicknesses.

To improve the contacting between the electrical contact and its mating contact, the gradient layer may have a noble-metal cover layer, at least regionally. The noble-metal cover layer preferably is between 0.1 μm and 0.3 μm thick and thus constitutes a so-called "flash" layer. Au, Ru, Pt and/or Pd are especially suitable as noble metals for the flash layer.

The contact layer is preferably produced according to a galvanic method or also according to a PVD (physical vapor deposition) method.

BRIEF DESCRIPTION OF THE DRAWING

The FIGURE shows a section through an electrical contact according to the present invention.

DETAILED DESCRIPTION

The FIGURE shows an electrical contact 1, which represents a contact of a plug connector as it is used in an automobile.

Electrical contact 1 includes a substrate 2, which is made of an alloy on copper basis such as CuSn4, CuNi2Si or the like. Substrate 2 has a thickness that is between 0.1 mm and 0.5 mm.

A contact layer 3, which is applied according to a galvanic method, is arranged on substrate 2 of electrical contact 1. Contact layer 3 constitutes a silver/tin substance system, the silver and tin forming an alloy with one another. The tin concentration in contact layer 3 decreases in an essentially linear fashion in the direction facing away from substrate 2, for instance from approximately 100% to approximately 20%. Contact layer 3 thus forms a gradient layer.

The thickness of contact layer 3 is in a range between approximately 1 µm and 3 µm.

Arranged on the upper surface of contact layer 3 is a so-called gold flashing or "flash" gilding having a thickness of approximately 0.2 µm, which is configured as cover layer 4.

In an alternative specific embodiment of an electrical contact, the gradient points in the opposite direction, so that the tin concentration in the contact layer increases in the substrate direction and the highest silver concentration therefore is present on the surface of the contact layer or gradient layer.

What is claimed is:

1. An electrical contact comprising:
   a metallic substrate; and,
   a contact layer in the form of a gradient layer applied on the metallic substrate, the gradient layer being composed of at least two elements, the at least two elements including a first element and a second element, wherein one of: (a) the first element is silver and forms an alloy with the second element, the second element including one of indium and tin, (b) the first element is tin and the second element is phosphorus, and (c) the first element is indium and the second element is tin;
   wherein a proportion of the first element and the second element in the gradient layer changes substantially linearly in a direction normal to a plane of the substrate.

2. The electrical contact according to claim 1, wherein the gradient layer has a thickness of between 1 µm and 3 µm.

3. The electrical contact according to claim 1, wherein the gradient layer has a noble-metal cover layer at least regionally.

4. The electrical contact according to claim 3, wherein the noble-metal cover layer has a thickness of between about 0.1 µm and 3 µm.

5. The electrical contact according to claim 3, wherein the noble-metal cover layer is composed of at least one of Au, Ru, Pt and Pd.

6. The electrical contact according to claim 1, wherein the gradient layer is applied on the substrate according to one of a galvanic method and a PVD method.

* * * * *